United States Patent [19]

Williamson

[11] Patent Number: 5,435,294
[45] Date of Patent: Jul. 25, 1995

[54] SAW

[75] Inventor: John Williamson, Chesterfield, England

[73] Assignee: Errut Products Limited, Derbyshire, England

[21] Appl. No.: 113,288

[22] Filed: Aug. 19, 1993

[30] Foreign Application Priority Data

Aug. 20, 1992 [GB] United Kingdom ............... 9217752

[51] Int. Cl.⁶ .......................... B28D 1/00; B28D 7/00
[52] U.S. Cl. ....................................... 125/12; 125/14; 451/344; 451/348
[58] Field of Search ................. 125/12, 13.01, 14; 451/344, 350, 352, 358, 359; 30/166.3, 379, 388, 389, 514, 517; 83/571

[56] References Cited

U.S. PATENT DOCUMENTS

| | | | |
|---|---|---|---|
| 2,736,311 | 2/1956 | Coates | 125/14 |
| 3,664,614 | 5/1972 | Baechle | 51/170 PT |
| 3,722,496 | 3/1973 | Schuman | 125/13.01 |
| 4,614,063 | 9/1986 | Crivaro et al. | 51/174 |
| 4,780,992 | 11/1988 | McKervey | 51/180 |
| 5,142,826 | 9/1992 | Zhang | 51/170 R |

Primary Examiner—Maurina T. Rachuba
Attorney, Agent, or Firm—Brian D. Smith

[57] ABSTRACT

A saw (10) is provided comprising a frame (20) containing a saw blade (22) and a fluid motor (24), and a handle (28) connected to the frame (22) incorporating means (36b) for connecting to a fluid supply and throttle means for controlling the fluid supply, wherein at least the portion of the handle (28) incorporating the throttle means is releasably connected to the frame (22) or the remainder of the handle so that the throttle means can be relocated elsewhere in the fluid supply. Preferably, the saw (10) further comprises a trolley (40) on which the frame (22) is releasably mountable so that the saw (10) can be operated either as a floor saw or a hand saw. The handle portion (28) can be relocated to the handlebar (50) of the trolley (40) to give the operator direct control over the fluid supply. Alternatively, separate throttle valves can be supplied on the saw (10) and the trolley (40) to achieve the same object.

19 Claims, 3 Drawing Sheets

SAW

FIELD OF THE INVENTION

The invention relates to a saw, particularly but not exclusively to an air or hydraulic saw which can be converted for use either as a hand saw or as a floor saw.

BACKGROUND TO THE INVENTION

The hand saw business has been dominated for many years by small two stroke petrol engined saws. The advantages of such portable, self contained hand power saws for use in the street, on site, etc. are clear. Nevertheless, there has also been a steady market for fluid-powered saws, both floor and hand, for use where air or hydraulic fluid supplies are readily available. For example, if a crew required to carry out a particular task utilises pneumatic breakers for which a small compressor is required or hydraulic breakers where a hydraulic supply is required, it is more convenient to use an air or hydraulic saw and thus utilise the same power supply than to have to carry two stroke petrol for a petrol saw. Another advantage of using an air or hydraulic saw is that they are safer to use, for example when working in a trench.

Because of these desirable features, conversion units have become available for some of the known petrol hand saws. However, these saws are not designed as fluid-powered saws and have certain disadvantages. For example, due to the physical size of even a small petrol engine, the proximity of the engine air intake to the dust and grit generated by the cutting operation of the blade and the proximity to sparks created by the cutting operation, the engine is normally positioned away from the blade. The blade is therefore driven by a belt or other suitable transmission means. When such a saw is converted for use with an air or hydraulic motor, the existing transmission is utilised and thus the air or hydraulic motor is similarly positioned away from the blade instead of positioned to provide direct drive as would normally be the case for a fluid-motor driven saw. Thus, although an air or hydraulic saw is provided, it is more bulky and less manoeuvrable than a saw specifically designed to be powered by a fluid motor. Additionally, there is increased mechanical complexity and loss of power as would be typical in a petrol saw. The majority of fluid saws developed so far have been for use as floor saws which have improved in style and performance over the last few years.

In some instances, fluid saws have been designed for conversion between use as a hand saw and use as a floor saw. The main problem in converting a hand saw to a floor saw is the positioning of the fluid safety shut off valve. In the case of a hand saw, the valve is located on the handle whereas, on a floor saw, the same valve is ideally located on the steering handlebar assembly. In the case of a convertable saw, a mechanical linkage is provided to operate the valve which is located on the handle of the saw. Usually, a bowden cable connection is used, although other types of connection have been tried. However, the more efficient and reliable connections are expensive and all mechanical linkages have the severe disadvantage that, if the linkage system fails, the operator must leave the saw controls to manipulate the fluid control on the hand saw. This can be extremely dangerous.

It is an object of the present invention to provide a fluid saw which can be easily and effectly converted for use either as a hand saw or as a floor saw and which will result in reliable and safe operation in both modes.

SUMMARY OF THE INVENTION

The invention provides a saw comprising a frame containing a saw blade and a fluid motor, and a handle connected to the frame incorporating means for connection to a fluid supply and throttle means for controlling the fluid supply, wherein at least the portion of the handle incorporating the throttle means is releasably connected to the frame or the remainder of the handle so that the throttle means can be relocated elsewhere in the fluid supply. Preferably, the portion of the handle incorporating the throttle means is connected to the remainder of the handle or the frame by means of quick-release, swivel couplings. More preferably, the couplings are bayonet-type couplings. Advantageously, the fluid supply is connected to the handle by means of quick-release, swivel couplings.

A saw according to the invention is versatile in that the throttle means for controlling the fluid supply can be moved to a convenient part of the fluid supply itself. This is particularly useful when converting the saw for use as a hand saw or as a floor saw as will be described below.

A spring loaded, non-return valve is preferably incorporated into each coupling. This increases safety of operation in the event that a coupling is accidentially released. Also, the changeover between use as a hand saw and use as a floor saw is facilitated since the fluid pressure need not be purged before the changeover is carried out.

In a preferred embodiment, the saw further comprises a trolley on which the frame is releasably mountable so that the saw can be operated either as a floor saw or as a hand saw. Preferably, the trolley comprises a handlebar to which the handle portion incorporating the throttle means is connectable, further fluid supply means being provided between the said handle portion and the remainder of the handle or the frame. In this way, the saw, previously designed as a hand saw, can be mounted for use as a floor saw and the throttle can be mounted directly on the handlebar by means of which the trolley is steered.

A preferable feature of the saw according to the invention is that height adjustment means for adjusting the height of the saw blade may be provided. When the saw is driven by an air motor, air lubricating means for lubricating the air supplied to the air motor and/or dust-suppressing means located on the trolley adjacent the saw blade may also be provided. Preferably, the dust-suppression means include an atomiser which is advantageously air powered. The air lubricating means can also incorporate an atomiser which may be air-powered.

The invention also provides a saw comprising a frame containing a saw blade and a fluid motor, and a handle connected to the frame incorporating means for connection to a fluid supply and first throttle means for controlling the fluid supply, the saw further comprising a trolley on which the saw is releasably mountable so that the saw can be operated either as a floor saw or as a hand saw, wherein further throttle means are also provided on the handle of the trolley for use when the saw is being operated as a floor saw, the first throttle means located in or on the handle of the saw being provided for use when the air saw is being operated as a hand saw.

This alternative embodiment of the invention achieves the same objects.

BRIEF DESCRIPTION OF THE DRAWINGS

An embodiment of the invention will now be described with reference to the accompanying drawings wherein.

DETAILED DESCRIPTION OF THE DRAWINGS

Figure 1:
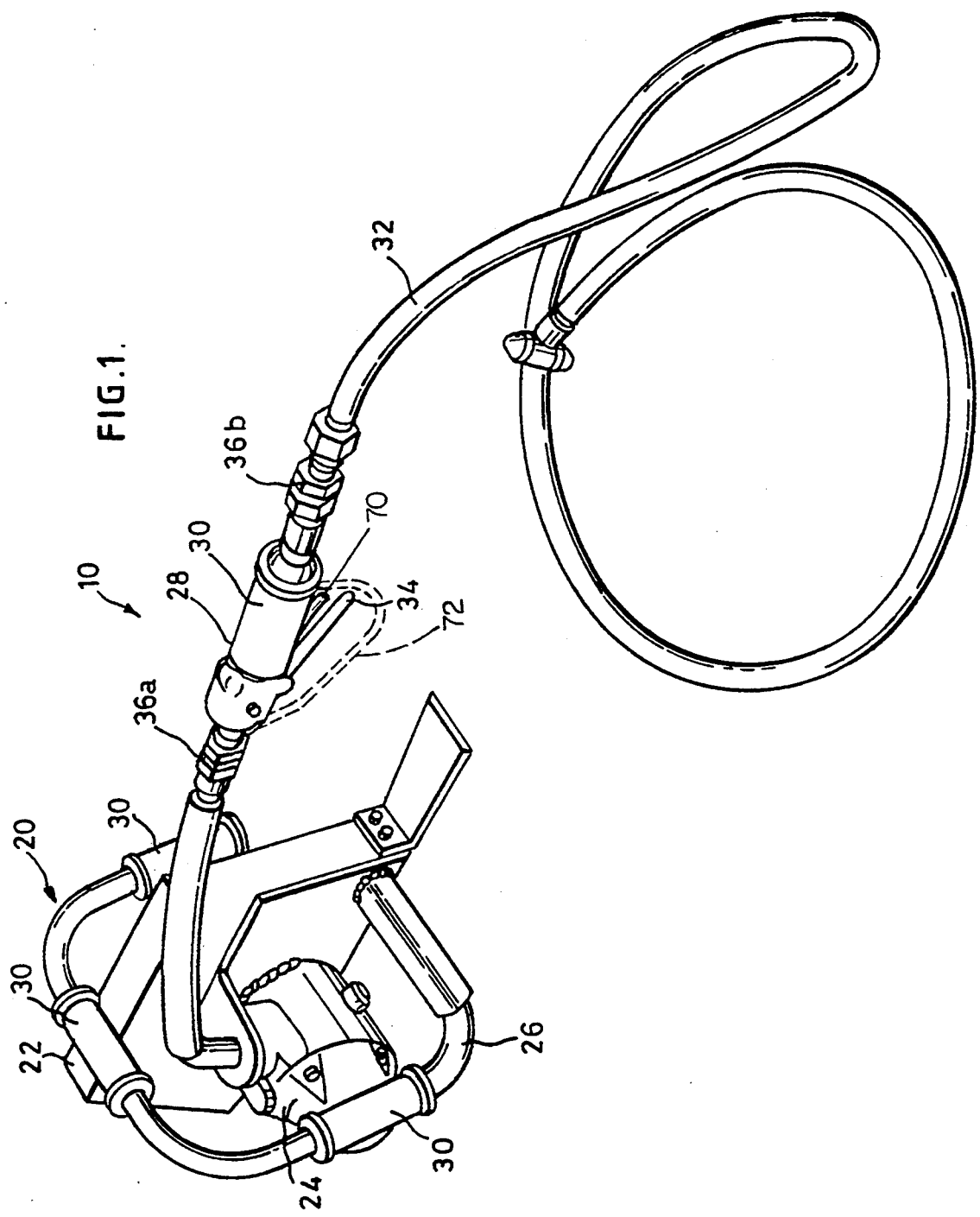
FIG. 1 is a perspective view of an air saw according to the invention ready for use as a hand saw.

FIG. 1 shows an air saw 10 incorporating a frame 20 containing a saw blade 22 (shown enclosed in a casing) and an air motor 24. Handle means 26, 28 carrying hand grips 30 are provided to enable an operator to manipulate the saw for use as a hand saw.

The handle portion 28 incorporates a throttle valve controlled by a lever 34 by means of which the air supply is controlled. An air hose 32 is connected to the free end of the handle 28 via which air is supplied to the air motor 24 to operate the blade 22. The handle portion 28 is releasably connected to the frame 20 and to the air hose 32 by means of quick-release, swivel connectors in the form of bayonet couplings 36a and 36b.

In order to operate the air saw as a hand saw, the air hose 32 is arranged to deliver a suitable air supply to the free end of the handle portion 28 and thus to the air motor 24 to power the saw blade 22. The hand saw can then be operated in the normal manner.

Figure 2:
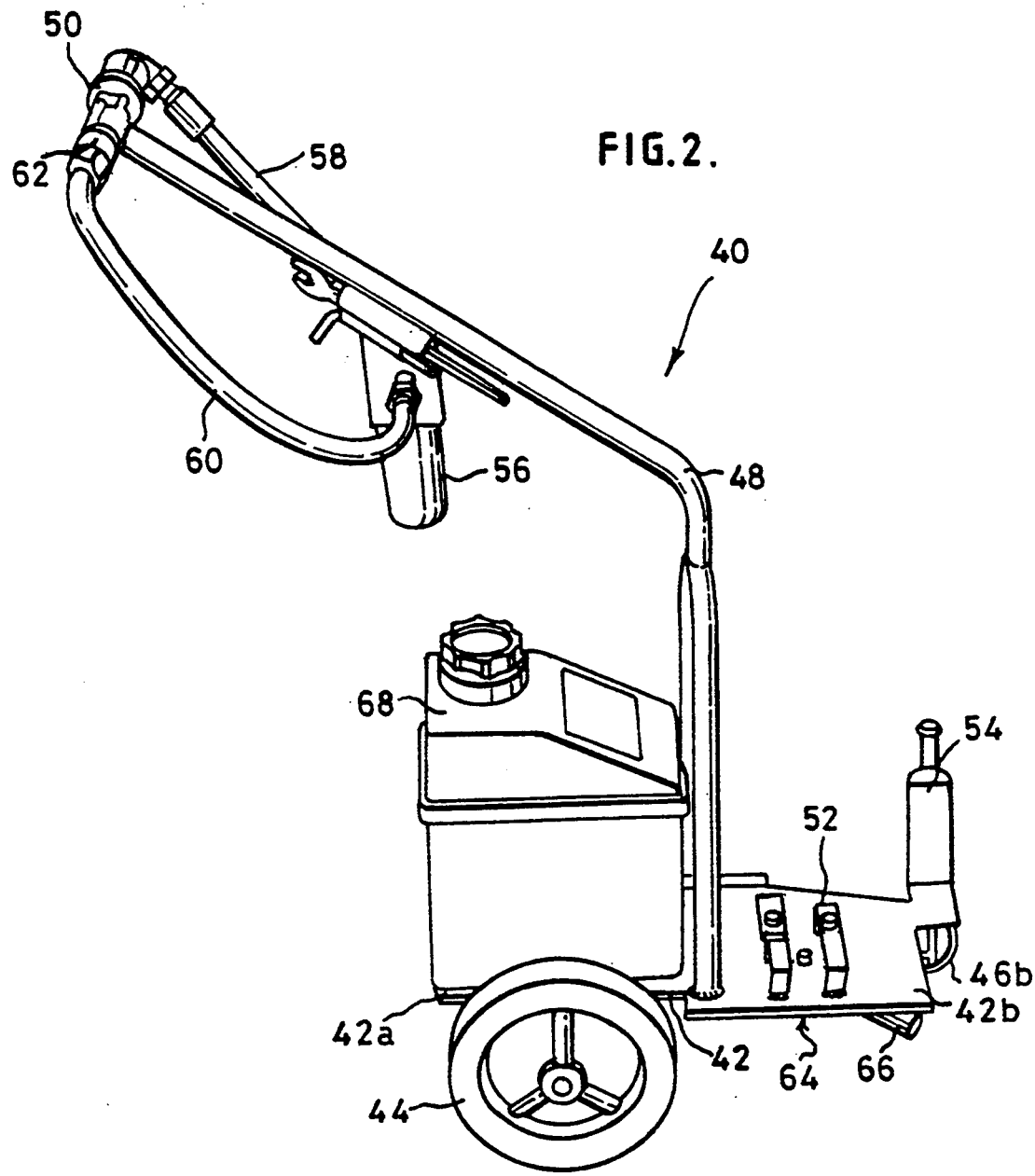
FIG. 2 is a side view of a trolley for use with the air saw of FIG. 1 to convert it for use as a floor saw.

FIG. 2 shows a trolley 40 upon which the air saw 10 shown in FIG. 1 can be mounted. The trolley 40 comprises a base 42 formed by two parts, namely a rear part 42a supported on wheels 44 and a forward steering part 42b supported on a single wheel 46. The trolley 40 is steerable by means of the handle 48 connected to the steering part 42b and terminating in a handlebar 50. The base 42 incorporates clamps 52 by means of which the air saw 10 shown in FIG. 1 can be connected to the steering part 42b of the base 42. The steering part 42b also incorporates height adjustment means 54 for adjusting the height of the saw blade when the air saw 10 is clamped to the base 42.

The trolley 40 also incorporates air lubricating means 56 mounted on the upper portion of the steering handle 48. The air lubricating means incorporates an atomiser for atomising oil droplets into the air passing therethrough. When in operation, air will be passed from the handlebar 50 to the lubricating means 56 and further to the air motor 24 via the connector 36a. The air hoses 58 and 60 are used for this purpose; the air hose 60 is shown in FIG. 2 in its "parked" position, i.e. connected to the handlebar 50 by means of the connector 62. This connector 62 would normally receive the throttle valve 34 when the apparatus is in use as a floor saw.

The trolley also includes dust suppression means 64 in the form of an atomising device for spraying fine droplets of water towards the centre of the saw blade via a nozzle 66. The water supply is contained in a tank 68 mounted on the rear portion 42a of the base 42. The dust suppression means are air powered and the air supply for powering these means 64 are directed to the dust suppression means via the handle structure 48 which is formed of hollow tubing.

Figure 3:
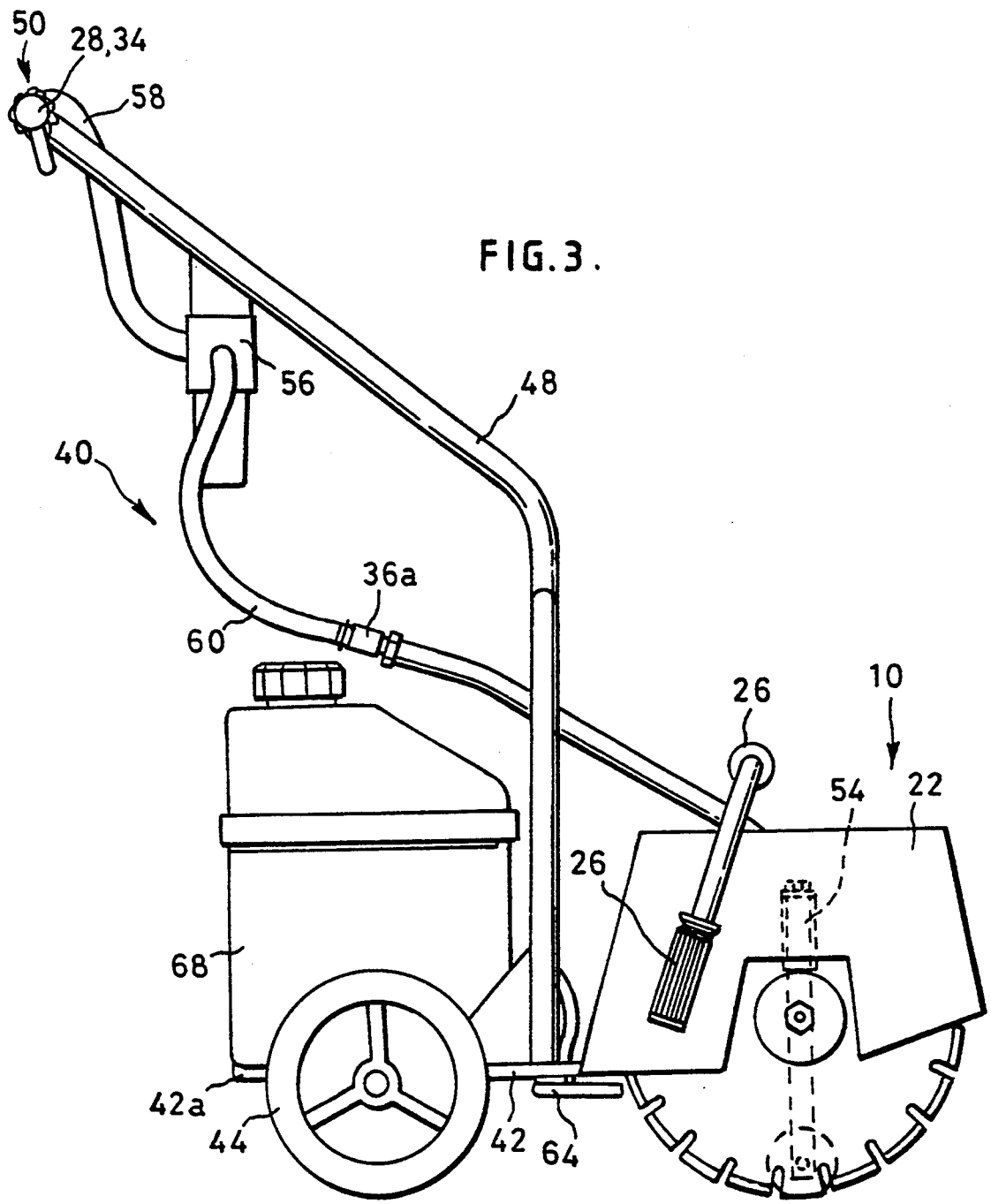
FIG. 3 is a schematic diagram of the combined saw and trolley shown in FIGS. 1 and 2 ready for use as a floor saw.

FIG. 3 shows the air saw 10 mounted on the trolley 40 and ready for use as a floor saw. The saw blade and casing 22 are mounted on the trolley base 42. The handle means 26 are not disconnected to facilitate re-conversion of the saw to a hand saw if desired. The dust suppression means 64 are directed towards the centre of the saw blade and can be activated by any suitable means. The height adjustment means 54 is adjusted to the required depth for the job to be carried out.

The handle portion 28 containing the throttle valve is removed from the frame 20 by releasing the bayonet connector 36a. The air hose 60 leading from the lubricating unit 56 is connected to connector 36a to supply lubricated air directly to the frame 20 and thus the air motor 24. The air hose 58 connecting the handlebar 50 to the lubrication unit 56 remains in place.

The handle portion 28 containing the throttle valve is then connected to the bayonet connector 62 on the handlebar 50. The air hose 32 is connected by means of connector 36b to the handle portion 28. Air supplied via air hose 32 thus travels through the throttle valve in the handle portion 28 (providing control of the air supply) to the handlebar 50, from the handlebar 50 to the lubrication unit 56 via air hose 58 and to the air saw 10 via the air hose 60 and connector 36a. The air is thus supplied to the air motor and operates the saw blade.

Some of the air supplied to the handlebar 50 is diverted into the hollow element 48 forming the handlebar structure. This air is used to power the dust suppressing means 64 supplied with water from the tank 68 which is ideally positioned between the two wheels 44. The air can also be used to power the lubrication unit 56.

It will be apparent to a skilled reader that the air motor 24 illustrated in the above-described embodiment can be replaced by an alternative fluid-powered motor such as a hydraulic motor.

The advantages of the saw described above are many. Firstly, the operator has direct control over the fluid supply when using the saw in either the hand saw or floor saw modes. There is no risk that a mechanical linkage could fail. Secondly, the swivelling bayonet-type couplings which connect the supply hoses to the apparatus are advantageous, particularly in the hand saw mode, because the swivel feature allows the saw to be used in any orientation whilst retaining full comfortable control of the valve. The swivel coupling prevents the supply line 32 twisting as the operator moves which can cut off the fluid supply or apply a reaction torque to the hand saw which will affect operation. When using the floor saw, the connectors allow the operator to adopt the most comfortable hand position to control the fluid flow with regard to the individual height of the operator and the cutting angle of the floor saw. Furthermore, manufacture is simplified by not requiring precise orientation during assembly. Connecting leads attached to the trolley and not in use when the saw is being used as a hand saw can also be plugged into the connectors to keep them out of the way and clean when not in use.

The bayonet couplings may incorporate spring loaded, non-return valves to facilitate the changeover between modes of operation and to increase the safety of operation, should a coupling fail or become disconnected.

The apparatus according to the invention is easy to use and to service. Any mechanical linkage would need to be set each time the saw is used in the floor saw mode because of the wear and tear which will occur with use. The apparatus of the invention does not need to be set in this way. Furthermore, the air lubrication unit and dust suppression apparatus provided in connection with an air saw can be permanently fitted to the trolley which means that conversion from hand saw mode to floor saw mode is quick and easy.

Various modifications and variations of the invention will be apparent to one skilled in the art. For example, since a primary object of the invention is to allow the Operator of the saw direct control over the fluid supply when using the saw in either the hand saw mode or the floor saw mode, then one alternative embodiment would involve providing separate throttle means on the saw itself (i.e. non-releasably mounted on the handle) and on the handlebar of the trolley. Means for locking the throttle means on the saw handle in the open position would need to be provided, preferably on the trolley to avoid these throttle means being locked open when the saw is in use in the hand saw mode. This embodiment also falls within the scope of the invention.

A further advantageous feature of the invention is the provision of a reversible flange plate presenting, The fluid throttle valve can incorporate an automatic lock-off switch 70. Alternatively, a trigger guard 72 can be provided to prevent accidental switching on.

Any or all of these preferred features, in any desired combination, may be included in the saw of the invention.

I claim:

1. A saw comprising a frame containing a saw blade, a fluid motor, and handle means for holding said saw, said handle means incorporating means for connection to a fluid supply, throttle means for controlling the fluid supply, and quick release means for releasably connecting said handle means incorporating said throttle means to said frame so that said handle means incorporating said throttle means can be quickly disconnected from said frame.

2. A saw as claimed in claim 1, wherein said quick release means includes quick-release, swivel couplings.

3. A saw as claimed in claim 2, wherein the couplings are bayonet type couplings.

4. A saw as claimed in claim 1, wherein the fluid supply is connected to the handle means by means of quick-release, swivel couplings.

5. A saw as claimed in claim 1, further comprising a trolley on which the frame is releasably mountable so that the saw can be operated either as a floor saw or a hand saw.

6. A saw as claimed in claim 5, wherein the trolley comprises a handlebar to which the handle means portion incorporating the throttle means is connectable, further fluid supply means being provided between the said handle means and the remainder of the handle means or the frame.

7. A saw as claimed in claim 1, wherein the fluid motor is a hydraulic motor.

8. A saw as claimed in claim 1, wherein the fluid motor is an air motor.

9. A saw as claimed in claim 8, wherein air lubricating means are provided for lubricating the air supplied to the air motor.

10. A saw as claimed in claim 5, wherein means for suppressing dust are located on the trolley adjacent the saw blade.

11. A saw as claimed in claim 10, wherein the dust suppression means include an atomiser.

12. A saw as claimed in claim 10, wherein the dust-suppression means are air-powered.

13. A saw as claimed in claim 8, wherein the dust suppression means and the air motor are powered by the same air supply.

14. A saw as claimed in claim 13, wherein, in use, the air for powering the dust-suppression means travel between the air supply and the dust-suppression means along at least one of the structural elements of the trolley.

15. A saw as claimed in claim 5, wherein height adjustment means for adjusting the height of the saw blade are provided on the trolley.

16. A saw comprising a frame containing a saw blade and a fluid motor, and handle means connected to the frame incorporating means for connection to a fluid supply and first throttle means for controlling the fluid supply, the saw further comprising a trolley on which the saw is releasably mountable so that the saw can be operated either as a floor saw or as a hand saw, wherein further throttle means are also provided on the handle means of the trolley for use when the saw is being operated as a floor saw, the first throttle means located in or on the handle means of the saw being provided for use when the saw is being operated as a hand saw.

17. A saw as claimed in claim 1, wherein the blade is provided with a blade guard.

18. A saw as claimed in claim 1, wherein the throttle mans incorporate an automatic lock-off switch.

19. A saw as claimed in claim 1, wherein a trigger guard is provided to prevent accidental switching on of the saw.

* * * * *